Aug. 2, 1960

R. LARSON 2,947,483

LAWN SPRINKLER

Filed May 21, 1957

INVENTOR.
Roland Larson
BY Max E. Shirk
His Attorney

United States Patent Office 2,947,483
Patented Aug. 2, 1960

2,947,483
LAWN SPRINKLER

Roland Larson, Tucson, Ariz., assignor of forty-nine percent to Willis R. Dees, Tucson, Ariz.

Filed May 21, 1957, Ser. No. 660,713

1 Claim. (Cl. 239—286)

This invention relates to an improved lawn sprinkler and more particularly to an inexpensive lawn sprinkler that may be produced as an advertising novelty.

It is an object of this invention to provide an inexpensive lawn sprinkler which is easily attached to a garden hose without using threaded connections.

It is another object to provide a lawn sprinkler which may be readily moved without shutting off the water supply thereto.

It is a further object to provide an inexpensive glider for a lawn sprinkler.

These and other objects will be more readily understood by referring to the drawings wherein.

Figure 1:
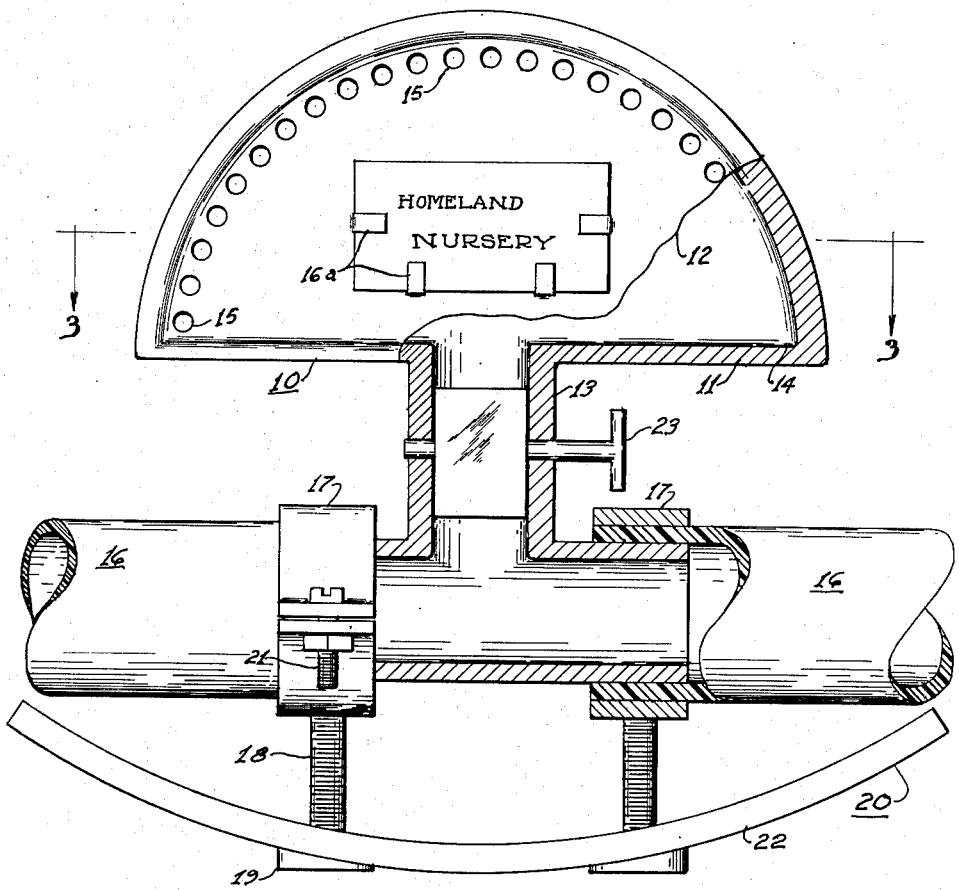
Fig. 1 is an elevational view, partly in section, of one embodiment of the invention.

Referring to Fig. 1 of the drawings, a sprinkler head 10 may include a rear portion 11 and a front portion 12. The rear portion 11 is attached, in a manner to be explained, to the rear half of a T-shaped pipe fitting 13. The front portion 12 is attached to the front half of the T-shaped pipe fitting 13.

I prefer to stamp the rear portion 11 and the rear half of the T-shaped fitting 13 as a unit from one piece of metal and to stamp the front portion 12 together with its half of the T-shaped fitting 13 from another piece of metal and then join the units together, as by welding. Of course it is obvious that the two portions may be cast from metal or moulded from plastic in well known manner. It is also apparent that a regular plumbing T can be used as a lower portion and a hollow shell can then be welded to the T to form the sprinkler head 10.

The rear portion 11 and the front portion 12 each have a lip 14, as shown in Fig. 1 on the rear portion only. Lip 14 serves to provide a space between the two portions 11 and 12 for the flow of water therethrough.

The front portion 12 is provided with apertures 15, as shown. The apertures 15 are very small, being from about 0.02 in. to 0.05 in. in diameter. Such fine apertures make it possible to use the sprinkler as a gentle soaker for newly sown lawns and also a deep soaker for well established lawns. The space between the apertures 15 is sufficiently flat and large to provide ample space for an advertising announcement. For this purpose I provide spaced clips 16a adapted to receive water-resistant advertising media. Of course it is obvious that the clips 16a can be arranged on the rear side of the sprinkler head 10.

The T-shaped fitting 13 is attached to a garden hose 16 by cutting the hose 16 in two and inserting the ends of T 13 into each end of the hose 16 where it was cut. The hose 16 is affixed to T 13 by means of hose clamps 17. The hose clamps 17 have depending bolts 18 provided with wedge shaped nuts 19. The sprinkler head 10 is maintained in an upright position on a glider 20 by inserting bolts 18 through holes therein. The sprinkler head 10 may be adjusted to position the apertures 15 relative to the lawn to be sprinkled by loosening bolts 21 in hose clamps 17 and rotating the sprinkler head 10 about a longitudinal axis through T 13.

The apertures 15 are spaced inwardly from the periphery of the front portion 12 to assure that water issuing from the sprinkler head 10 will be directed forwardly. This is done so that a person may approach the sprinkler head 10 from the rear while water is issuing from the sprinkler withotu getting wet. Thus, the sprinkler may be moved without turning the water off.

Figure 3:
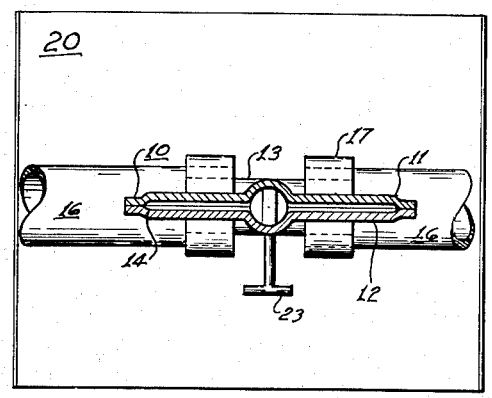
Fig. 3 is a plan view, partly in section on a reduced scale, taken along line 3—3 of Fig. 1.

The glider 20 consists of a short section of metal or other suitable material which may be shaped to form a curved runner 22. The runner 22 may have sufficient width, as shown in Fig. 3, to prevent the sprinkler head 10 from tipping over when it is being moved.

The sprinkler head 10 may be provided with a shut-off valve 23, as shown in Fig. 1. Such a valve may be desirable when a series of sprinkler heads 10 are inserted along a single hose 16 so that pressure losses along the line may be offset.

Figure 2:
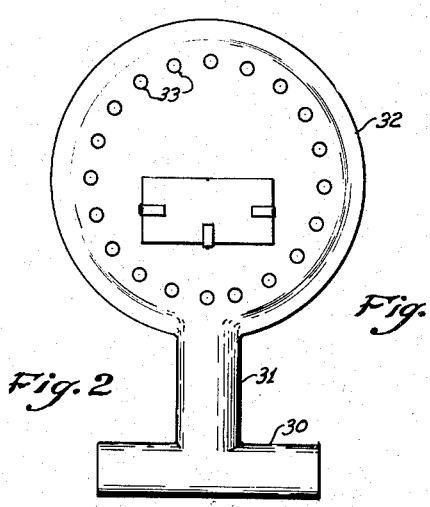
Fig. 2 is an elevational view of another embodiment of the invention.

The embodiment shown in Fig. 2 consists of a horizontal pipe section 30, a vertical pipe section 31 and a circular sprinkler head 32. The pipe sections are welded together as shown and the sprinkler head is welded to the top of the vertical pipe section 31, as shown. The sprinkler head 32 may be constructed in the same manner as the sprinkler head 10 shown in Fig. 1.

The sprinkler head 32 employs apertures 33 of the same size as those shown in Fig. 1 and has them equally spaced in a circular pattern instead of the semi-circular pattern of Fig. 1. I find that the circular pattern produces a wider and more concentrated spray than the semi-circular pattern.

Thus, it is seen that I have provided an inexpensive sprinkler which may be connected to a hose without the use of threaded connections and which may be moved from place to place about a lawn without shutting off the water thereto.

Of course it will be obvious to those skilled in the art that various modifications of the invention may be made without departing from the spirit and scope thereof. Accordingly, I do not wish to be limited by the embodiments shown for purposes of illustration, but not of limitation.

I claim:

A lawn sprinkler for sprinkling a lawn with a gentle spray of water comprising a glider, a sprinkler head including a hollow, perforated shell and a T-shaped base portion having two free arms, a hose, said hose encompassing said free arms of said base portion, and means for mounting said sprinkler head on said glider, characterized in that said means for mounting said sprinkler head on said glider comprises clamping means rigidly affixed to said glider encircling said hose in clamping relationship where it encompasses said free arms, in that the cross-sectional area of said hollow shell is less than the cross-sectional area of said base portion, and in that said perforations are small enough to restrict water issuing therefrom to a gentle spray, said clamping means being adapted to maintain said sprinkler head in selected lawn sprinkling positions whereby said gentle spray of water may be directed at any desired angle between a horizontal direction and a vertical direction.

References Cited in the file of this patent

UNITED STATES PATENTS

| | | |
|---|---|---|
| 1,589,351 | Blaw | June 22, 1926 |
| 2,124,551 | Friedman | July 26, 1938 |
| 2,469,534 | Wessels | May 10, 1949 |
| 2,709,624 | MacChesney | May 31, 1955 |
| 2,785,010 | Nelson | Mar. 12, 1957 |

FOREIGN PATENTS

| | | |
|---|---|---|
| 16,894 | Great Britain | Nov. 22, 1901 |